Nov. 24, 1931.  A. G. McGREGOR  1,833,400
LIQUID CIRCULATING PLANT
Filed May 4, 1928  2 Sheets-Sheet 1
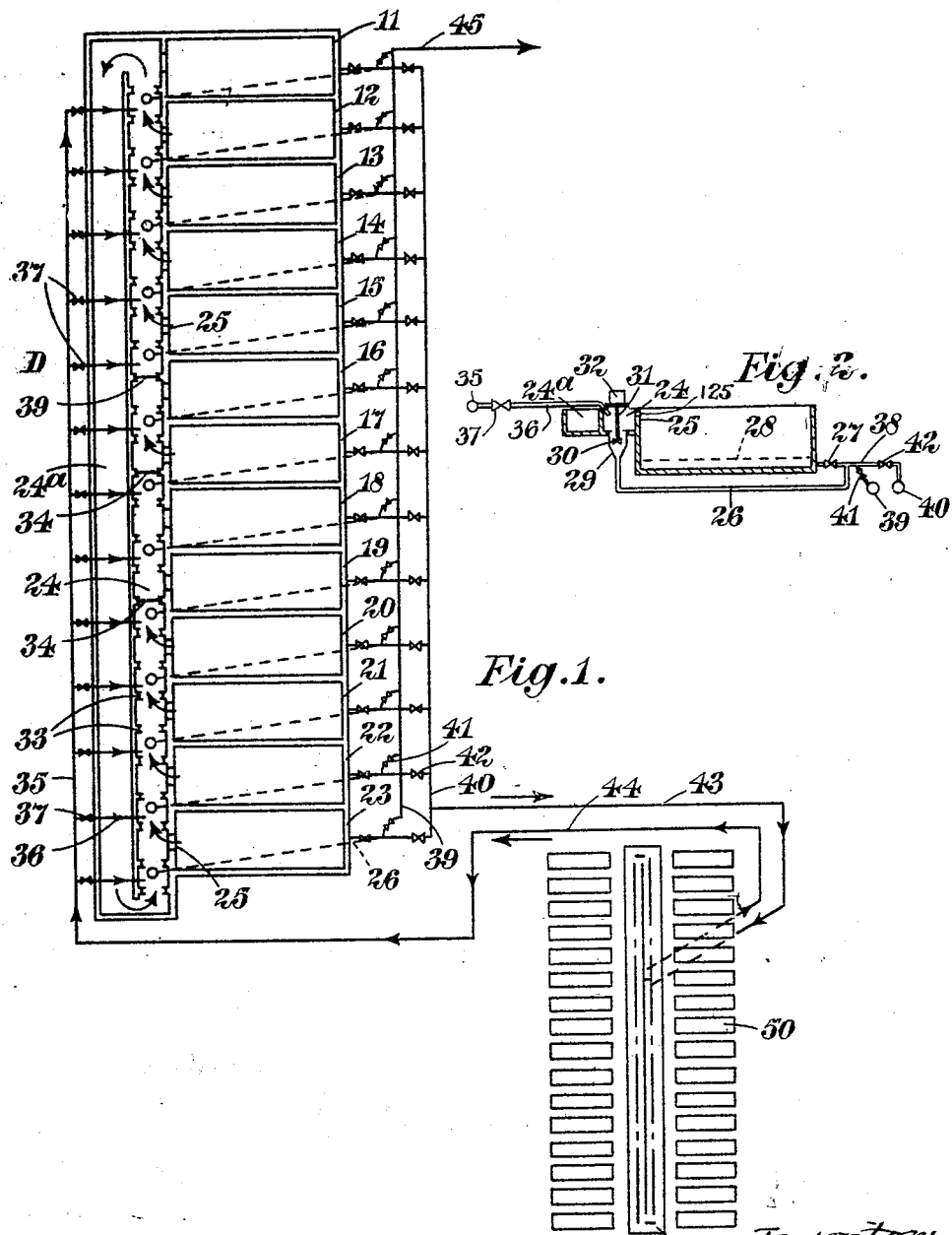

Nov. 24, 1931.  A. G. McGREGOR  1,833,400
LIQUID CIRCULATING PLANT
Filed May 4, 1928  2 Sheets-Sheet 2

Inventor.
Alexander Grant McGregor,
by Robert V. Galvin,
Attorneys.

Patented Nov. 24, 1931

1,833,400

UNITED STATES PATENT OFFICE

ALEXANDER GRANT McGREGOR, OF LONDON, ENGLAND

LIQUID CIRCULATING PLANT

Application filed May 4, 1928. Serial No. 275,081.

This invention comprises improvements in liquid-circulating plant and has more particular reference to such plant when employed for leaching purposes, or for electrolytic plants where the electrolyte has to be circulated through large batteries of cells, or to analogous apparatus.

It is an object of the invention to provide a flexible circulating system which is capable of enabling liquid to be circulated through a battery of tanks in series without necessitating that the rate of flow through each tank should be identical with the rate of flow through the remainder. Another object of the invention is to provide a circulating system adapted for operation on the counter-current principle. Another object of the invention is to provide a circulating system which enables one or more of the tanks, cells or other units through which liquid is to be circulated to be cut out of operation for cleaning, refilling or repairs while permitting all the other units of the system to remain in normal operation.

According to one feature of the present invention there is provided in plant comprising a battery of tanks and apparatus for circulating liquid therethrough, the combination with the tanks of a manifold-conduit having inlet connections and outlet connections in parallel to the tanks, means to induce circulation between the tanks and manifold through the inlet and outlet connections, and means to feed liquid for circulation to the system at one end of the series of tanks and to withdraw liquid from circulation at the other end of said series. In this manner it is possible to circulate the liquid a number of times through any one tank and if desired a different number of times through another tank without in any way interfering with the regular flow of liquid through the system which takes place through the manifold. In fact although the liquid is circulated through the tanks in series there is no interruption to the circulation if one or more tanks has to be cut out of action.

According to a further feature of the present invention in plant comprising a battery of tanks and apparatus for circulating liquid therethrough the combination with the tanks of a ring manifold-conduit having inlet connections and outlet connections in parallel to the tanks, means to interrupt the manifold at will at any one of a plurality of points situated respectively between adjacent tanks, means to induce circulation between the tanks and manifold through the inlet and outlet connections, and means to feed liquid for circulation to the system at one side of the point of interruption of the manifold and to withdraw liquid from circulation at the other side of that point. The term "ring manifold" is intended to include either a conduit which is self-closed by the ends being directly joined together, or one in which the ends are united by other means, for example a pipe or the like with or without means therein to ensure circulation of fluid therethrough, the essential characteristic being that it shall be possible for liquid to circulate from any one point in the conduit to any other notwithstanding that the conduit may be interrupted, as for example by a gate across it at some one point. By this means the battery of tanks can be divided into a series which begins with any one tank in the battery and all the remaining tanks will then receive liquid in series after it has had access to the initial tank beyond the point of interruption. The manifold may be either an open channel or launder or a pipe or the like.

The invention comprises the combination of a leaching system constructed as above described with an electrolytic plant also constructed as above described. In the leaching plant the advantage is obtained of great flexibility in the distribution of liquor combined with freedom from breakdown and ability to employ counter-current leaching in the simplest possible manner. In the electrolytic plant, in addition to the advantages of flexibility in circulation, an increase in efficiency is obtainable as hereinafter described.

The accompanying drawings illustrate one embodiment of the invention by way of example.

In the drawings:—

Figure 1 is a diagram of the general arrangement of a combined leaching and electrolytic plant.

Figure 2 is a cross-section through a leaching tank and associated apparatus.

Figure 3:
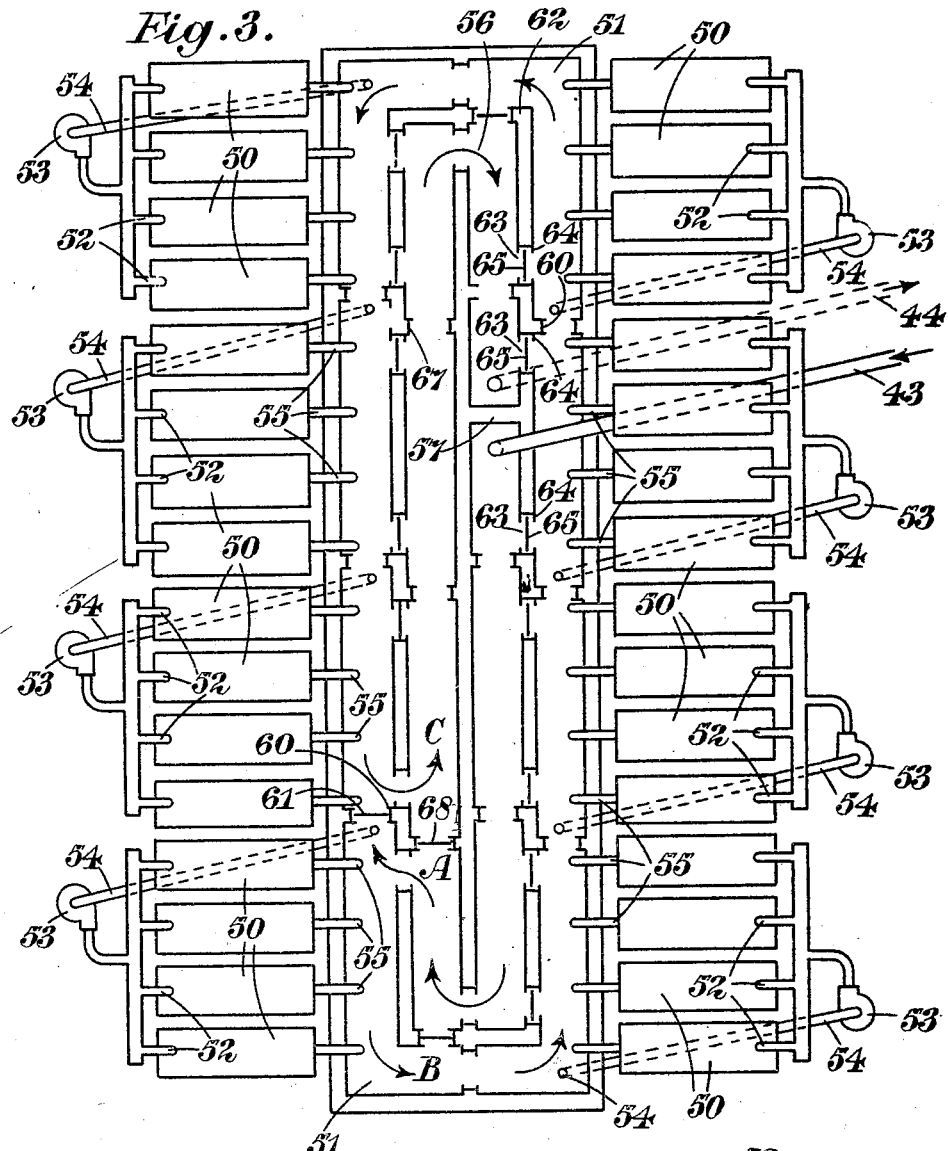
Figure 3 is an enlarged diagrammatic plan of an electrolytic plant.
Figure 4:
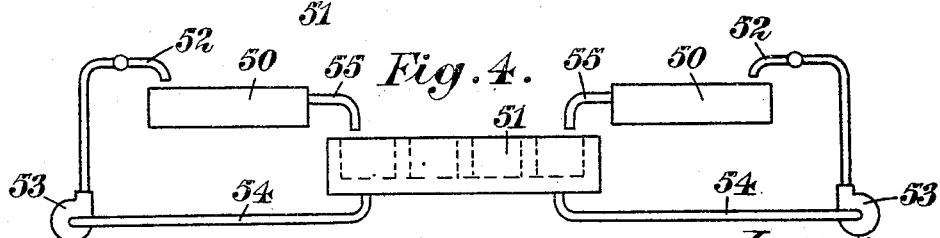
Figure 4 is a corresponding cross-section therethrough.

It will be understood that the various figures are not drawn to scale, the control means being magnified for the purpose of rendering the details clear.

Referring to Figure 1, this shows a battery of leaching tanks arranged side by side and numbered serially 11 to 23 inclusive. These leaching tanks may be as large as desired or necessary to contain, say, one day's charge of ore so that one tank in the battery can be freshly brought into use each day, a tank of spent ore being simultaneously cut out of the system for emptying. Along the head ends of the tanks there extends a manifold in the form of an open channel 24, the ends of which are in communication with and are united by a return channel 24a so that the whole constitutes a ring or endless conduit. At intervals opposite each tank the manifold channel 24 is provided with openings in the bottom connected to circulation pipes 26 which pass beneath the tanks to the ends remote from the manifold 24, where they enter the tanks at the bottom through control valves 27. The tanks 11 to 23 are provided with false bottoms 28 on which the material to be leached rests. Between the top of each tank and the channel 24 is a weir-opening 25. Each of the pipes 26 is enlarged at the portion 29 where it leaves the channel 24 and in the enlarged portion is a rotating impeller 30 actuated by a shaft 31 from a driving gear diagrammatically indicated at 32.

The channel 24 is provided along its sides with a number of vertical slideways 33 which are adapted to receive removable cross-gates 34. As can be seen from inspection of Figure 1, slides to receive a cross-gate are provided between each of the pipes 26 and each of the weirs 25. The weirs 25 are made adjustable in height by removable slats 125.

A leaching liquor supply main 35 extends along the side of the ring manifold 24, 24a and is provided with branches 36 controlled by valves 37. Each branch delivers into the manifold adjacent to the end of one of the pipes 26.

In addition to the connection of the pipes 26 with the bottoms of the tanks 11 to 23 they have branches 38 which connect them with two draw-off mains 39, 40. The connection of each pipe 36 with the main 39 is controlled by a valve 41 and its connection with the draw-off main 40 is controlled by a valve 42. The draw-off main 40 is connected by a pipe 43 to the electrolytic cells. The return pipe 44 from the electrolytic cells is connected to the supply-main 35. The draw-off main 39 is intended for wash water and is connected by a pipe 45 with plant, not shown, for dealing with such wash water. For delivery of wash water to the apparatus a suitable main provided with branches for delivery to the manifold 24 can be provided, but is not shown for the sake of clearness.

The electrolytic plant comprises a battery of electrolytic cells 50 which are supplied with electrolyte from a distributing channel 51 supplied by and delivering to the pipes 43, 44. The arrangement is shown in detail in Figure 3.

The cells 50 are disposed in groups of four each having electrolyte-supply pipes 52 at one end which are connected to the delivery of a centrifugal pump 53 the inlet of which is connected by a pipe 54 of the distributing manifold channel 51. The electrolytic cells have outlets 55 which deliver into the said channel. The outlets 55 take the form of open channels with weirs (not shown) between them and the tanks 50 so that the level in the tanks of the electrolyte can be adjusted. Thus each group or section of four of the cells 50 is operated in parallel one with another. The channel 51 is a ring-conduit, that is to say, its ends are joined to itself, as shown in Figure 3 and it follows a rectangular course. Within the channel 51 is a second conduit 56 which extends alongside the channel 51 throughout its length but the continuity of which is broken by a transverse partition 57 at one point. The pipes 43, 44 are connected to the inner conduit 56 one on one side and one on the other of the partition 57.

Between each section of the cells 50 the channel 51 is provided with vertical guides 60 to receive removable cross-gates 61. Adjacent to each of the guides 60 and at either side thereof the wall 62 between the channels 51 and 56 is pierced by passages 63 having vertical guides 64 to receive removable gates 65. The channel 56 is also provided with vertical guides 67 at intervals opposite to the connections of the pipes 52 with the manifold 51 to receive removable cross-gates 68. All the cross-gates are made of the same size and interchangeable with one another.

In operation the plant above described is intended to be used in the leaching of valuable contents from ores or the like by the passage through ore located in the leaching tanks 11 to 23 of suitable solvent solution, which when sufficiently enriched by contact with the ore is carried to the electrolytic cells and the metal content of the solution therein deposited and recovered while the solution is regenerated and in its regenerated condition returned to the leaching tanks.

In considering the operation of the plant in detail it will be convenient to begin with the electrolytic cells: The enriched solution from the leaching tanks enters the inner conduit 56 by way of the pipe 43 and, assuming for example that the gates are set in the position indicated in the drawings, the solution will pass around the conduit 56 until it encounters the first cross-gate 68 set across the same, as shown at the point A in the drawings. The gate 65 in the wall 62 has at this point been removed and the leaching solution therefore passes out into the manifold conduit 51. The pump 53 of the adjacent section of the cells 50 being in operation, the bulk of the entering electrolyte or leaching solution will be drawn through the conduit 52 from the manifold 51 and delivered to the cells 50 from which it returns through the pipes 52 to the manifold 51. If the pump 53 is operating rapidly a rapid circulation will be set up, the rate of which is independent of the rate of entry of fresh leaching solution at A. Consequently the electrolyte may be circulated one or more times through the cells, or it may be circulated insufficiently fast for the whole of it to be drawn in through the pipe 52 so that some of it passes on directly to the next section of cells. All of these results are under the immediate control of the operator by varying the speed of the pump 53.

A net quantity of electrolyte equal to that entering at A passes on beyond the cells of the first section of the series to the next cells, as shown by the arrow B and here it is further subjected to circulation and electrolysis. The operation is repeated through the remaining cells of the series and finally spent electrolyte having passed completely round the manifold 51 re-enters the inner conduit 56, as shown by the arrow C and passes around it to the outlet pipe 44.

In the operation of the cells it is arranged that all the cathodes in each one of the eight groups of cells are of substantially the same age. The cathodes in the group of cells on to which the electrolyte is first directed will be one day old, in the next group two days old and in the last group eight days old. By means of the weirs in the outflow conduits 55, the solution is arranged to be at its highest when the cathodes are first placed in the cells and to be slightly lowered each day. This prevents local action between the electrolyte and the cathode plate at the electrolyte surface from eating away the supports of the cathode.

Fresh electrolyte entering the battery of cells is not very corrosive and therefore when the fresh electrolyte is directed on to the new plates, as above described, although these are thin they will not be eaten away. As the plating progresses the supports or loops of the cathode sheets at the electrolyte surface become thicker owing to decomposition of copper and so when the electrolyte level is lowered at a subsequent stage of electrolysis the portion of the cathode exposed to the corrosive action at the electrolyte surface is thicker than a new cathode and although at this stage the electrolyte is more corrosive it is unable to weaken the supports sufficiently to give trouble. It will be seen that the more corrosive the solution becomes the thicker is the cathode support or loop which is exposed to it. When electrolysis in a given cell has proceeded to such a point that the cathodes require renewal and replacement, this is effected by changing a few cathodes from the cell at a time and allowing the current to flow during the changing through the remaining cathodes. The cell is at no time cut completely out of operation, and circulation of the electrolyte proceeds continuously in all the cells.

In order that the advantages of the described arrangement may be appreciated, it is convenient to take a concrete example of the electrolysis of copper sulphate derived from leaching a copper sulphide ore with sulphuric acid. Such ores commonly contain iron which enters into solution as ferrous sulphate and even if the ore does not naturally contain iron it is desirable for reasons hereinafter pointed out that some iron should be introduced into the solution as the efficiency of the leaching action is thereby increased. In the electrolysis of copper from an electrolyte containing ferrous sulphate some of the latter is oxidized to the ferric state. Ferric sulphate being a very active solvent of copper causes undesirable local action upon the deposited copper with a corresponding loss of current efficiency. Now, if as is the general practice, the electrolytic cells are all arranged in parallel so as to receive the same kind of leaching solution as one another each cell will always contain the same content of ferric sulphate as its neighbours. Since conditions in the leaching plant necessitate the supply of an electrolyte having a high content of ferric sulphate it will inevitably result that a considerable amount of local action will occur in every cell. Moreover the high percentage of ferric iron in the cells leads to a spongy deposit of copper. These disadvantages are overcome according to my invention in several ways:—

In the first place the efficiency can be increased, notwithstanding the presence of ferric sulphate, by increasing the rapidity of circulation of the electrolyte and this is done independently of the rate at which fresh electrolyte is introduced to the circuit. In the second place, the cells are operated not in parallel with one another but in series, that is to say the cell at A in the drawing is receiving fresh electrolyte. It will therefore be working at a high efficiency since ferric iron will be low in amount. Subsequent cells will work with gradually increasing amounts of ferric iron, but even the last cell has no more ferric iron present than have all the cells in the case of parallel operation, so that the average current efficiency is higher. In the third place, it is possible, by suitably operating the gates 61, 65 and 68 to direct fresh solution for a short time on to the last cell in the circuit before replacing the cathodes by new ones. This has the effect of covering any spongy iron deposit produced in the last stages with a layer of dense copper which protects it from loss or crumbling off in subsequent handling and transportation.

Similar problems arise in the leaching and electrolysis of other materials with different electrolytes and my apparatus yields in such cases parallel advantages to those above described for the case of copper sulphate electrolysis.

The outgoing solution from the electrolytic cells through the pipe 44 is high in ferric iron and in sulphuric acid but low in copper sulphate. It is therefore an efficient solvent for copper sulphide, the ferric iron considerably assisting its solvent properties. This solution is passed into the manifold 24 from the pipe 35 by opening one of the valves 37 on the branch pipes therefrom. In Figure 1 the valve at D is assumed to be open and a cross-gate 34 at one side of the point D is shown in position. The tank 15 which is in communication with the section of the manifold 24 just beyond the cross-gate 34 at D constitues therefore the first tank of the series. Leaching is on the counter-current principle and this tank will therefore contain nearly exhausted ore. The fresh strong leaching solution enters the tank 15 through its pipe 26, percolates upwards through the ore and passes back into the manifold 24 through the weir overflow 25 of this tank. By altering the speed of the impeller 30, the number of times which the liquid circulates in the tank 15 can be varied. If the impeller 30 is rotating rapidly the greater portion of the solution will be drawn again through the pipe 26 and recirculated through the ore. A portion, however, equal to the amount coming in through the pipe 35 will pass on to the next tank 14. Such circulation will be repeated in the tanks 14, 13, 12 and 11 and the leaching solution will then pass along the return channel 24a until it reaches the pipe 26 of the tank 23. From here circulation will proceed through the tanks, as before, until the tank 20 is reached. Here the inlet manifold is interrupted by another cross-gate 34 and the leaching solution passes out of the system by way of the pipe 26 of the tank 19 through the valve 42 to the draw-off main 40. For this purpose the valve 42 is opened and the valve 27 of the tank 19 is closed. The now-enriched leaching solution passes back to the electrolytic cells again.

It will be observed that the leaching solution has passed through nine of the thirteen leaching tanks in series. The remaining four tanks are cut off from the leaching solution by the gates 34 in the manifold 24. The tanks 16 and 17 contain wash water which is introduced from a main having branches, not shown in the drawings, and is circulated through these two tanks in series. The tank 18 is being emptied of exhausted ore and the tank 19 is being filled with fresh ore. The wash water from the tanks 15, 16 is carried off through the main 39 and if it contains sufficient copper values the copper may be precipitated therefrom, for example by passing it over scrap iron, as disclosed in my United States Patent No. 1,753,015.

It will be appreciated that in order to bring into action a leaching tank of new ore such as 19 it is necessary to move the gate 34 which interrupts the inlet manifold on one side of the tank to a new position on the other side of the tank. Similarly in order to cut the tank 15 out of operation all that is necessary is to move the cross-gate 34 from the position D to a new position further up the manifold, simultaneously shutting the valve 37 at D and opening the valve 37 on a next branch from the pipe 35.

It will be observed that the described operations can all be carried out with a minimum of labour so that operating expense of the plant is reduced, and that the operations in the leaching and electrolytic plants are arranged to fit in one with the other so that the process goes on continuously and cyclically, while a break down of any one unit does not interfere with the general operation of the plant.

Make-up solution, such as sulphuric acid can be introduced into the leaching system by a branch in the pipe 43.

I claim:—

1. In a leaching system the combination of a battery of leaching tanks, a ring-manifold in the form of an open channel having sections corresponding to each tank, removable cross-gates for interrupting the channel at will at various points between said sections, draw-off and return-connections between each section of the manifold and corresponding tank, means to deliver leaching solution to said manifold at any desired section, and means to draw off leaching liquor from the leaching system at any desired tank at will.

2. In a leaching system the combination of a battery of leaching tanks arranged side by side, a ring-manifold in the form of an open conduit extending across the ends of the tanks near the top thereof and in communication therewith through weir-openings, inlet connections from the manifold to said tanks comprising pipes from the bottom of the manifold channel beneath the tanks and opening into the tanks near the bottom at the far end thereof from the manifold, removable gates to interrupt the manifold at will at any one of a plurality of points situated respectively between adjacent tanks, means to feed fresh leaching solution to said manifold at one side of the said point of interruption thereof and means to withdraw used leaching solution from the other side of said interruption.

3. A leaching system as claimed in claim 2 wherein the means to withdraw used leaching solution comprise a pipe having branches in communication with the inlet-pipes from the channel to the bottom of the leaching tanks.

4. A leaching system as claimed in claim 2 wherein a rotatable impeller is located in the inlet-pipe from the manifold to the bottom of the leaching tanks.

5. In an appartus for circulating liquid through tanks, the combination of a series of tanks, a manifold conduit having inlet and outlet connections to all tanks, means to induce circulation in and between the tanks, the said means consisting of vanes supported and revolved by a vertical shaft, a housing in which said vanes revolve, the overflow of a tank communicating with the top of the housing and the bottom of the housing communicating with the bottom of the tank.

6. In plant comprising a battery of tanks and apparatus for circulating liquid therethrough, the combination, with the tanks, of a ring manifold-conduit having inlet and outlet connections in parallel to the tanks, means to interrupt the manifold at will at any one of a plurality of points situated respectively between adjacent tanks, means to induce circulation between the tanks and manifold through the inlet and outlet connections, means to feed liquid for circulation to the system at one side of the point of interruption of the manifold and to withdraw liquid from circulation at the other side of that point, said outlet connections having branches in communication with each tank, and control means for bringing any one branch into operation as may be desired, for the purpose set forth.

7. In a leaching system, the combination of a battery of leaching tanks, a ring-manifold having inlet connections and outlet connections to the said tanks in parallel, means to induce circulation between the tanks and manifold through said connections, means to interrupt the manifold at will at any one of a plurality of points situated respectively between adjacent tanks, means to feed fresh leaching solution to said manifold at one side of the said point of interruption thereof, and means to withdraw used leaching solution from the other side of said interruption, said manifold being in the form of an open channel adjacent to the tops of said leaching tanks and being in communication therewith through weir openings.

8. In a leaching system, the combination of a battery of leaching tanks, a ring-manifold having inlet connections and outlet connections to the said tanks in parallel, means to induce circulation between the tanks and manifold through said connections, means to interrupt the manifold at will at any one of a plurality of points situated respectively between adjacent tanks, means to feed fresh leaching solution to said manifold at one side of the said point of interruption thereof and means to withdraw used leaching solution from the other side of said interruption, said leaching tanks being arranged side by side, and said ring-manifold being in the form of a channel extending along the ends of said tanks and being in communication therewith through weir-openings and said manifold being connected together at its two ends by a return channel.

In testimony whereof I affix my signature.
ALEXANDER GRANT McGREGOR.